United States Patent
Johansen (10) Patent No.: US 12,129,826 B2
(45) Date of Patent: Oct. 29, 2024

(54) METHOD FOR HANDLING A WIND TURBINE BLADE

(71) Applicant: Vestas Wind Systems A/S, Aarhus N (DK)

(72) Inventor: Niklas Høvring Johansen, Aalestrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 234 days.

(21) Appl. No.: 17/795,724

(22) PCT Filed: Mar. 10, 2021

(86) PCT No.: PCT/DK2021/050075
§ 371 (c)(1),
(2) Date: Jul. 27, 2022

(87) PCT Pub. No.: WO2021/180286
PCT Pub. Date: Sep. 16, 2021

(65) Prior Publication Data
US 2023/0175492 A1   Jun. 8, 2023

(30) Foreign Application Priority Data

Mar. 10, 2020   (EP) .................................... 20162082

(51) Int. Cl.
*F03D 13/40*   (2016.01)
*B63B 27/10*   (2006.01)
*F03D 80/50*   (2016.01)

(52) U.S. Cl.
CPC .............. *F03D 13/40* (2016.05); *B63B 27/10* (2013.01); *F03D 80/50* (2016.05)

(58) Field of Classification Search
CPC .......... F03D 13/10; F03D 13/40; F03D 80/50; B63B 27/10; F05B 2240/95
See application file for complete search history.

(56) References Cited

U.S. PATENT DOCUMENTS

2014/0314576 A1   10/2014   Lieberknecht et al.

FOREIGN PATENT DOCUMENTS

| CN | 106837706 A | 6/2017 |
| CN | 109139389 A | 1/2019 |

(Continued)

OTHER PUBLICATIONS

Taiwan Patent Office, Office Action and Search Report issued in corresponding TW Application No. 110108528, dated Aug. 7, 2024; English translation of Search Report only.

(Continued)

*Primary Examiner* — Moshe Wilensky
(74) *Attorney, Agent, or Firm* — Wood Herron & Evans LLP (57) ABSTRACT

The invention provides a method for handling a blade (11) for a horizontal axis wind turbine (1), the blade extending longitudinally between a blade root (111) and a blade tip (112), the method comprising—supporting the blade (11) with one or more cranes (3), moving, by means of the one or more cranes (3), the supported blade (11) so as to be placed on one or more first support elements (4111) of a first support device (411) and on one or more second support elements (4121) of a second support device (412), removing the support of the one or more cranes (3), so as for the blade (11) to be supported by the one or more first support elements (4111) and the one or more second support elements (4121) on which the blade is placed, the second support device (412) being located between the blade root (111) and the blade tip (112), and the first support device (411) being, compared to the second support device, located closer to the blade root, moving the first and second support devices (411, 412) so as to move the blade (11) supported by the first and second support elements (4111, 4121), and/or moving a third support device (413), so that the third support (Continued)

device (413) assumes a support position between the second support device (412) and the blade tip (112), and removing, while the third support device (413) is in the support position, the support of the one or more second support elements (4121) so as for the blade (11) to be supported by one or more third support elements (4131) of the third support device, and by the one or more first support elements (4111).

11 Claims, 8 Drawing Sheets

(56) References Cited

FOREIGN PATENT DOCUMENTS

| EP | 2666669 A1 | 11/2013 |
| EP | 3090171 A1 | 11/2016 |
| TW | 201903282 A | 1/2019 |
| WO | 2019245366 A1 | 12/2019 |

OTHER PUBLICATIONS

European Patent Office, Extended European Search Report in EP Application No. 20162082.0, Sep. 15, 2020.
European Patent Office, International Search Report and Written Opinion in PCT Application No. PCT/DK2021/050075, Jul. 16, 2021.

METHOD FOR HANDLING A WIND TURBINE BLADE

The present invention relates to a method for handling a blade for a horizontal axis wind turbine, and an apparatus for handling one or more horizontal axis wind turbine blades.

BACKGROUND

A horizontal axis wind turbine typically comprise a tower supporting a nacelle to which a rotor is mounted. The rotor comprises one or more wind turbine blades which extend radially from a central hub.

Sometimes one or more of the blades of a wind turbine need to be maintained or repaired. The reason could be that a leading edge protection on the blades needs to be renewed. Another reason could be that a blade has obtained a damage which needs to be repaired.

The blades are usually removed from the wind turbine, and installed on the wind turbine by means of a crane. Thereby the blade may be suspended from a crane boom. For maintaining or repairing a blade, support devices may be used which allow rotating the blade around a longitudinal extension of the blade. Such support devices may be engaged with the blade while the is suspended by the crane. Thereby, the suspension may allow the blade to move unintentionally, and thereby, the blade may be damaged while an attempt is made to engage one of the support devices.

Further, in many jurisdictions, it is not allowed for a person to be present under a load suspended by a crane. Doing so might put the person at risk. This means that staff cannot work on the maintenance of a blade that has been removed from a wind turbine, if the blade is in an area of a crane suspended load. This might be a problem, e.g. in offshore applications, where the crane and blade maintenance activities may share a limited space on a marine vessel. If staff working on blade maintenance or repair, needs to interrupt the work and relocate while another blade is handled by the crane, the result is a decrease in productivity of the maintenance or repair procedure.

SUMMARY

It may be seen as an object of the present invention to provide an improved method for handling a blade for a horizontal axis wind turbine.

In further detail it may be seen as an object of the invention to reduce the risk of blade damage when handling a wind turbine blade. It may alternatively or additionally be seen as an object of the invention to increase the productivity of wind turbine blade maintenance or repair. Preferably, the invention alleviates, mitigates or eliminates one or more of the above or other disadvantages or problems singly or in any combination.

The objects are reached with a method according to claim 1. Thus, the invention provides a method for handling a blade for a horizontal axis wind turbine, the blade extending longitudinally between a blade root and a blade tip, the method comprising supporting the blade with one or more cranes, moving, by means of the one or more cranes, the supported blade so as to be placed on one or more first support elements of a first support device and on one or more second support elements of a second support device, and removing the support of the one or more cranes, so as for the blade to be supported by the one or more first support elements and the one or more second support elements on which the blade is placed, the second support device being located between the blade root and the blade tip, and the first support device being, compared to the second support device, located closer to the blade root, the method further comprising providing a third support device, the method further comprising moving the first and second support devices so as to move the blade supported by the first and second support elements, and/or moving the third support device, so that the third support device assumes a support position between the second support device and the blade tip, the method further comprising removing, while the third support device is in the support position, the support of the one or more second support elements so as for the blade to be supported by one or more third support elements of the third support device, and by the one or more first support elements.

Thus, an improved method for handling a blade for a horizontal axis wind turbine is provided. Embodiments of the invention provide for placing, by means of the one or more cranes, the blade on the first and second support elements, and subsequently moving the blade, and/or the third support device, so that the third support device assumes the support position. This provides a significant improved control over the blade handling, compared to placing the third support element in the support position while the blade is supported, e.g. suspended, by the one or more cranes. Thereby, the risk of blade damage when handling the blade is reduced.

Embodiments of the method may be a method for maintenance or repair of a blade. The invention further provides for placing, by means of the one or more cranes, the blade on the first and second support elements, in a first activity region. By moving the blade by means of the first and second support devices, at least a portion of the blade may be moved from the first activity region to a second activity region. Alternatively, at least a portion of the blade may be moved from the first activity region to the second activity region by moving the blade by means of the first and third support devices. This may be done e.g. after the support of the second support elements has been removed. Thereby, the blade, or the portion thereof, may be moved away from an activity region with suspended crane loads.

As exemplified below, the second activity region may be provided by a workshop for maintenance and repair of the blade. In such embodiments, suspended crane loads may be moved over the workshop. In some embodiments, the first and second activity regions have no vertical limit. The first and second activity regions may be completely separate horizontally. Thereby, no suspended loads may be moved over maintenance or repair activities.

Thus, embodiments of the invention provide for maintenance or repair to be conducted on the blade, or the portion thereof, without being interrupted by further activities of the one or more cranes. Removing the need for such interruptions will increase the productivity of blade maintenance or repair procedures.

The method may comprise removing, by means of the one or more cranes, the blade from a hub of a wind turbine, whereby the step of supporting the blade with the one or more cranes, is carried out. Supporting the blade with one or more cranes may comprise supporting the entire weight of the blade with the one or more cranes. Supporting the blade with one or more cranes may comprise suspending the blade in one or more wires from a crane boom. The step of supporting the blade with the one or more cranes may comprise holding the blade with a blade gripping device of a crane.

When moved so as to be placed on the first and second support elements, the blade may be supported by the one or more cranes. Upon placing the blade on the first and second support elements, the blade may be secured to the first and/or second support device. The one or more second support elements may be provided as a cradle. The first support device may be located at the blade root. The blade root may be provided with an interface for mounting the blade on a rotor hub of the wind turbine.

Removing the support of the one or more cranes may comprise releasing the one or more cranes from the blade. By removing the crane support, the blade may be supported only by the first and second support devices.

The first support device may be movable. The second support device may be movable. In some embodiments, the first and second support devices are moved so as to move the blade, so that the third support device assumes the support position between the second support device and the blade tip. Moving first and second support devices so as the move the blade may comprise moving the blade in a longitudinal direction of the blade. The first and second support devices may be provided in any suitable way to be adapted to move while supporting the blade. For example, one or both of the first and second support devices may be provided as a dolly. As exemplified below, the first and second support devices may be arranged to move along one or more rails.

As exemplified below the third support device may be stationary when the first and second support devices are moved so as the move the blade. Thereby, the third support device may be permanently stationary, or temporarily stationary.

In some embodiments, the third support device is movable. The third support device may be arranged to move in a longitudinal direction of the blade. Thereby, the method may comprise moving the third support device, so that the third support device assumes the support position between the second support device and the blade tip. In further embodiments, the first, second, and third support devices are moved, so that the third support device assumes the support position.

Removing the support of the one or more second support elements may comprise removing the support of the one or more second support elements so as for the blade to be supported only by the one or more third support elements, and by the one or more first support elements.

The third support device may comprise a frame, wherein the step of moving the first and second support devices so as to move the blade comprises moving the blade tip through the frame. The one or more third support elements may be provided inside the frame. The one or more support elements may comprise clamps. The one or more support elements may have a shape that is adapted to the shape of the blade at the support position. The blade the have an airfoil shape at the support position.

The frame of the third support device may be circular. The frame may be arranged to rotate around a longitudinal extension of the blade. The third support device may provide with the frame a tip turner ring. The first support device may be adapted to allow the blade to rotate around the longitudinal extension of the blade. Thereby, when the blade is supported by the one or more third support elements, and by the one or more first support elements, the blade may be rotated around the longitudinal extension of the blade. This facilitates for staff performing maintenance or repair work on the blade, since good working positions can be found regardless of the area on the blade being worked on.

The method may comprise, after the step of removing the support of the one or more cranes, moving the first support device, and at least one of the second and third support devices, while the blade is supported by the one or more first support elements, and at least one of the one or more second support elements and the one or more third support elements, so as to move at least a portion of the blade into a workshop for maintenance or repair work on the blade. Preferably, the method comprises, after the step of removing the support of the one or more cranes, moving the first support device, and the second support device, while the blade is supported by the one or more first support elements, and the one or more second support elements, so as to move at least a portion of the blade into a workshop for maintenance or repair work on the blade.

The workshop may provide an activity region outside of an activity region with loads suspended by the one or more cranes. Thereby, the workshop may be horizontally separate from the activity region with loads suspended by the one or more cranes. In some embodiments, the workshop may provide staff with a protection against suspended loads. Thereby, blade maintenance or repair may be carried or while further blades are handled by the one or more cranes. For example, a suspended blade may be moved over the workshop.

Preferably, when the blade is supported by the one or more third support elements, and by the one or more first support elements, a region of the blade extending from the blade tip to the third support device is cantilevered from the third support device. The cantilevered region of the blade may be outside of an activity region of suspended loads by the one or more cranes. The cantilevered region may be provided by the move of the first and second support devices so as for the third support device to assume the support position. Thereby, the move of the first and second support devices provide the double effect of moving the region of the blade out of the way from the suspended loads, and moving the blade so as to be supported by the third support element, so as to be ready to work on for maintenance or repair. This will make the maintenance or repair process more efficient. Thereby its productivity may increase.

The cantilevered region of the blade may be free of objects preventing access to the surface of the cantilevered region. Thereby, the cantilevered region may provide free to access for maintenance or repair. As suggested, the first and third support devices may be arranged to rotate the blade around its longitudinal extension, whereby the maintenance or repair may be facilitated.

Preferably, at least a part of the cantilevered region of the blade is in a workshop for maintenance or repair work on the blade. The workshop may protect and allow staff to work on the blade, while the crane moves a further suspended blade, e.g. over the workshop. Thereby, the maintenance or repair work on the blade may be undertaken while the crane moves a further suspended blade, e.g. over the workshop.

Preferably, the third support device is stationary during the step of moving the first and second support devices so as to move the blade. This may reduce the risk of damage to the blade.

Preferably, the step of removing the support of the one or more second support elements comprises lowering the one or more second support elements so as for the blade to be supported by the one or more third support elements, and by the one or more first support elements. It may be possible to change the height of the one or more second support elements. This may be done by any suitable means. For example, a scissor lift may be arranged to adjust the height of the one or more second support elements. Thereby, lowering the one or more second support elements may be done by means of the scissor lift. Thereby, the blade may be supported by only the first and third support elements. Thereby, the blade may be rotated around its longitudinal extension, and exemplified above.

Alternatively, the step of removing the support of the one or more second support elements may comprise raising the one or more third support elements, and/or raising the one or more first support elements. Thereby, the blade may be supported by the first and third support elements only.

The first, second, and third support devices may be located on a deck of a sea vessel during the steps of moving the blade by means of the one or more cranes, and moving the first and second support devices so as to move the blade. Thereby, the wind turbine may be an offshore wind turbine. Thereby, the invention may be particularly advantageous in view of the limited space typically available on the deck of a wind turbine service vessel. For example, the deck may be divided into two areas, one of which is reserved for crane operations with suspended loads, and the other of which is reserved for blade maintenance or repair work. Thus, the two areas may form separate activity regions.

Preferably, the first and second support devices are arranged so as to be moved along one or more rails, wherein the step of moving the first and second support devices, so as to move the blade, comprises moving the first and second support devices along the one or more rails. In some embodiments, the third support device is arranged so as to be moved along one or more rails. Thereby, the step of moving the third support device may comprise moving the third support device along the one or more rails. The one or more rails may provide for the support devices to be moved only along a fixed line. This may improve the accuracy of the movements. This may in turn decrease the risk of damages when engaging the third support device to the blade. The one or more rails may be fastened, e.g. welded to a support structure, such as the deck of a vessel.

The movable support devices may be powered by suitable devices, such as electric or hydraulic motors. The movements of the support devices may be controlled in any suitable way, e.g. by remote control.

The objects are also reached with an apparatus for handling one or more horizontal axis wind turbine blades, which blades each extend longitudinally between a blade root and a blade tip, the apparatus comprising
a first support device comprising one or more first support elements,
a second support device comprising one or more second support elements,
a third support device comprising one or more third support elements,
one or more rails arranged on a support structure,
wherein the first and second support elements are arranged to support a blade, while the second support device is located between the blade root and the blade tip, and the first support device is, compared to the second support device, located closer to the blade root,
wherein the first and second support devices are arranged so as to be moved along the one or more rails, while the blade is supported by the first and second support elements, and/or the third support device is arranged to move along the one or more rails, so that the third support device assumes a support position between the second support device and the blade tip,
wherein the apparatus is arranged to remove, while the third support device is in the support position, the support of the second support elements so as for the blade to be supported by the one or more third support elements, and by the one or more first support elements.

The support structure may be a deck of a sea vessel. The apparatus may comprise a workshop for maintenance or repair work on the blade, wherein the one or more rails extend from a position outside the workshop, towards the workshop, so that the blade can be moved along the one or more rails so that at least a portion of the blade extends into the workshop. The one or more rails may stop short of the workshop. In some embodiments, the one or more rails may extend into the workshop. The workshop may be, together with the one or more rails, provided on a support structure, such as the deck of a marine vessel, herein also referred to as a sea vessel.

Preferably the apparatus comprises a plurality of maintenance lines. Thereby, the one or more rails may form a first rail set, wherein the apparatus further comprises a second rail set in the form of one or more rails arranged on the support structure,
wherein the apparatus further comprises a fourth support device comprising one or more fourth support elements, and a fifth support device comprising one or more fifth support elements,
wherein the fourth and fifth support elements are arranged to support a further blade, while the fifth support device is located between a blade root and a blade tip of the further blade, and the fourth support device is, compared to the fifth support device, located closer to the blade root of the further blade,
wherein the fourth and fifth support devices are arranged so as to be moved along the one or more rails of the second rail set, while the further blade is supported by the fourth and fifth support elements, and/or a sixth support device is arranged to be moved along the one or more rails of the second rail set, so that the sixth support device assumes a support position between the fifth support device and the blade tip of the further blade,
wherein the apparatus is arranged to remove, while the sixth support device is in the support position, the support of the fifth support elements so as for the further blade to be supported by one or more sixth support elements of the sixth support device, and by the one or more fourth support elements.

The plurality of maintenance lines allows for making a particularly advantageous use of the invention. In one of the maintenance lines, a blade may be received, or removed, by the one or more cranes. Meanwhile, in another of the maintenance lines, a blade may be maintained or repaired. An activity region for crane handling for all maintenance lines may be separate from an activity region of maintenance and repair in all maintenance lines. Thereby, maintenance or repair work in one of the maintenance lines does not have to be interrupted by crane activities at any of the remaining maintenance lines.

BRIEF DESCRIPTION OF THE DRAWINGS

Below, examples of the invention are described in detail with reference to the drawings, in which.

DETAILED DESCRIPTION OF EMBODIMENTS OF THE INVENTION

Figure 1:
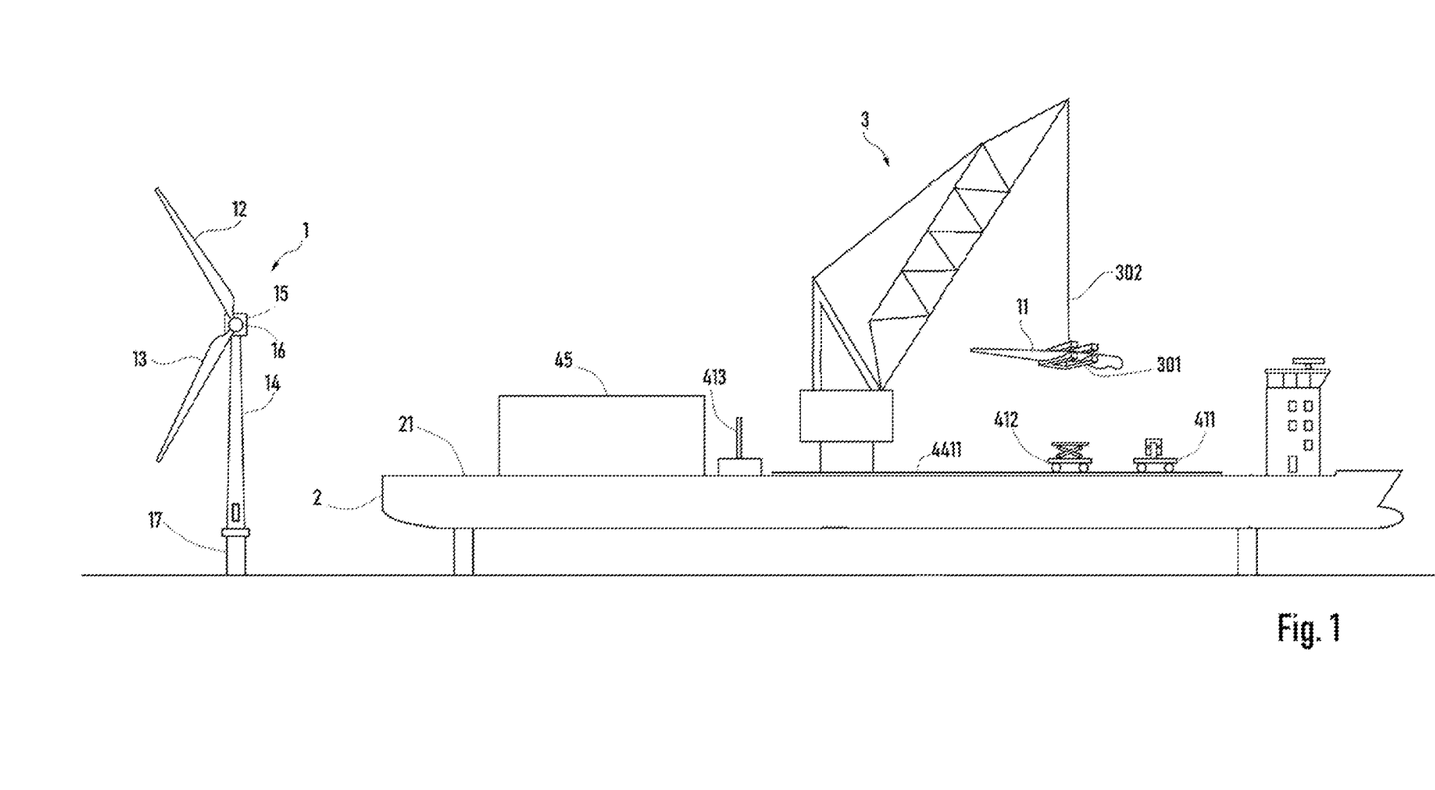
FIG. 1 shows a horizontal axis wind turbine and a marine vessel for a maintenance or repair procedure for the wind turbine.

FIG. 1 shows a service procedure for a horizontal axis wind turbine 1. The wind turbine comprises a tower 14 supporting a nacelle 15 to which a rotor is mounted. The tower may be mounted on an offshore foundation 17. The offshore foundation 17 may be e.g. a monopile foundation, a jacket foundation, or a floating foundation. It should be noted that the invention is equally applicable to an onshore wind turbine.

The rotor comprises a plurality of wind turbine blades 11, 12, 13 that extend radially from a central hub 16. In this example, the rotor comprises three blades. Each blade may extends from a generally cylindrical root to a blade tip in a longitudinal 'spanwise' direction. Each blade may be of any suitable length, e.g. in the interval 30-120 metres. Each blade may transition from a circular profile to an airfoil profile moving from the root end of the blade towards a shoulder of the blade, which is the widest part of the blade where the blade has its maximum chord. Each blade may extend between a leading edge and a trailing edge in a transverse 'chordwise' direction. Each blade may present a pressure surface on a pressure side of the blade and a suction surface on a suction side of the blade. Each blade may comprise a shell formed primarily of fibre-reinforced composite (FRC). Each blade may comprise an internal structure. The internal structure comprises two spar caps and two webs.

In a method according to an embodiment of the invention, a crane 3 is used. The crane is in this example located on a marine vessel 2. The marine vessel may be a jack-up vessel 2 as exemplified in FIG. 1, or some other type of suitable vessel. It should be noted that in onshore embodiments, the crane may be located on the ground or on a vehicle.

The method may comprise removing, from the hub 16, one or more of the blades 11, 12, 13 of the wind turbine, by means of the crane. Thereby, the crane may support the blade 11 by holding the blade with a blade gripping device 301 of the crane 3. The blade gripping device 301 may be suspended by one or more wires 302 from a boom of the crane 3.

An apparatus for maintaining the blade 11 may comprise a first support device 411, a second support device 412, and a third support device 413. The first and second support devices may be arranged to be moved along one or more rails 4411. Each of the first and second support devices may comprise a plurality of wheels arranged to roll along the one or more rails. The rails may be fastened to a support structure 21. The rails may be straight. The support structure may be the deck of a sea vessel, as exemplified in FIG. 1. In an onshore application, the support structure may be the ground, or a stationary support arrangement.

The third support device 413 is in this example fixed to the sea vessel deck 21. In an onshore application, the third support device 413 may be fixed to the ground, or a stationary support arrangement.

The apparatus further comprises a workshop 45 for maintenance or repair work on the blade 11.

Figure 2:
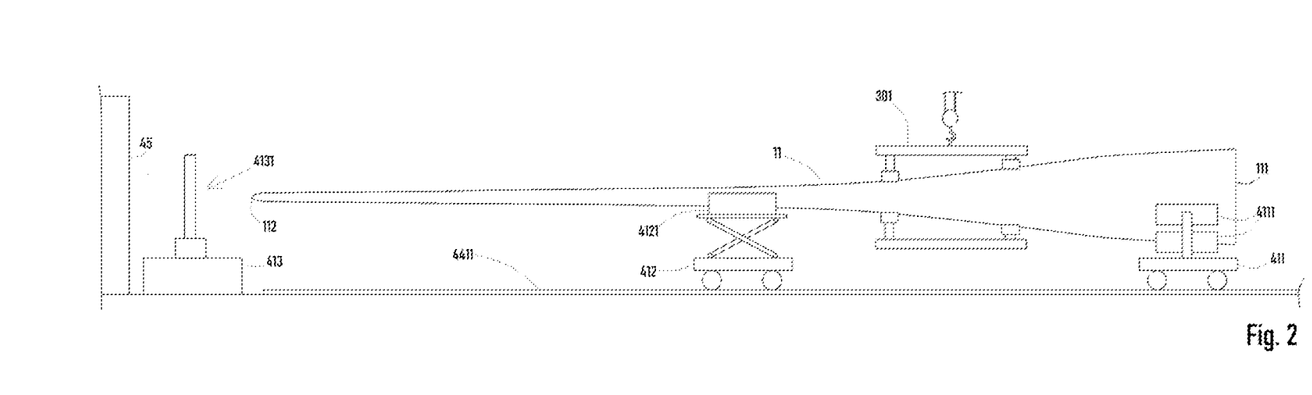
FIG. 2-FIG. 4 show side views of parts of an apparatus on the vessel in FIG. 1, for maintenance of a blade of the wind turbine.

Reference is made also to FIG. 2. The method may comprise moving, by means of the crane 3, the blade 11 so as to be placed on one or more first support elements 4111 of the first support device 411 and on one or more second support elements 4121 of the second support device 412.

Thereafter, the blade gripping device 301 may be removed from the blade. Thereby, the support of the crane 3, so as for the blade 11 to be supported by the one or more first support elements 4111 and the one or more second support elements 4121. Thereby, the second support device 412 may be located between the blade root 111 and the blade tip 112. The first support device 411 may be, compared to the second support device, located closer to the blade root. As exemplified in FIG. 2, the first support device may be located at or near the blade root. The first support device may contact the cylindrical part of the blade at the blade root. The second support device 412 may be located at a distance from the blade root 111. The second support device 412 may be located at a distance from the blade tip 112. The second support device 412 may be located closer to a middle of the blade than to any of the blade root 111 or the blade tip 112.

The third support device 413 may be located in a direction of a longitudinal extension of the one or more rails 4411. Upon placing the blade on the first and second support devices 411, 412, the third support device 413 is located at a distance from the blade. Thereby, the third support device 413 may be located in a direction of a longitudinal extension of the blade. The blade tip 112 may be the part of the blade that is closest to the third support device 413.

Figure 3:
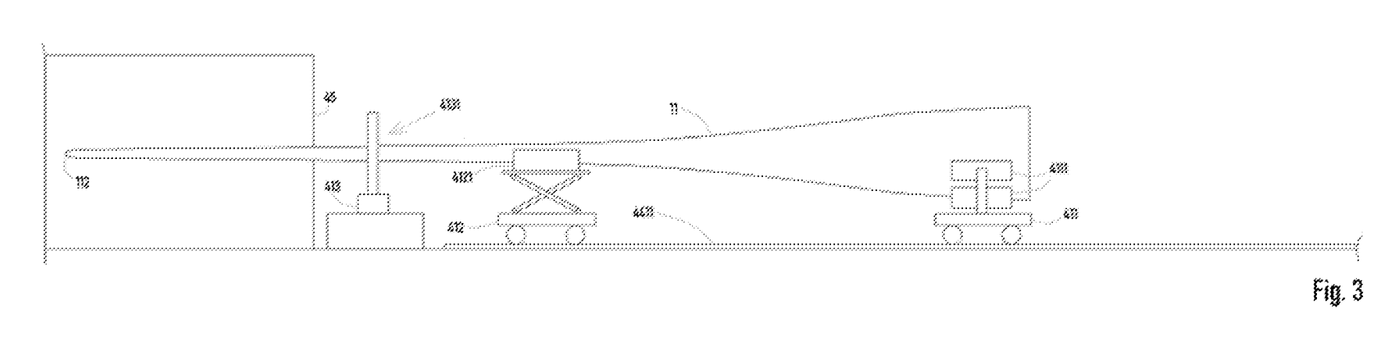

Reference is made also to FIG. 3. The method may comprise moving the first and second support devices 411, 412 along the one or more rails 4411, so that the third support device 413 assumes a support position between the second support device 412 and the blade tip 112. Thereby, the blade tip 112 may be moved over, or, as exemplified below, through, the third support device, so that the third support device end up in the support position. Thereby, the third support device 413 may be closer to the second support device 412 than to the blade tip 112. The support position of the third support device may 413 be located closer to a middle of the blade than to any of the blade root 111 or the blade tip 112.

The one or more rails 4411 may extend from a position outside the workshop 45, towards the workshop. As exemplified in FIG. 3, the blade is moved along the one or more rails so that a portion of the blade extends into the workshop 45. A region of the blade extending from the blade tip 112 towards the blade root may extend into the workshop 45. The third support device 413 may be located outside the workshop 45. The third support device 413 may be located in the vicinity of the workshop 45. In some embodiments, the third support device 413 may be located inside the workshop 45.

Figures 4, 5, 6:
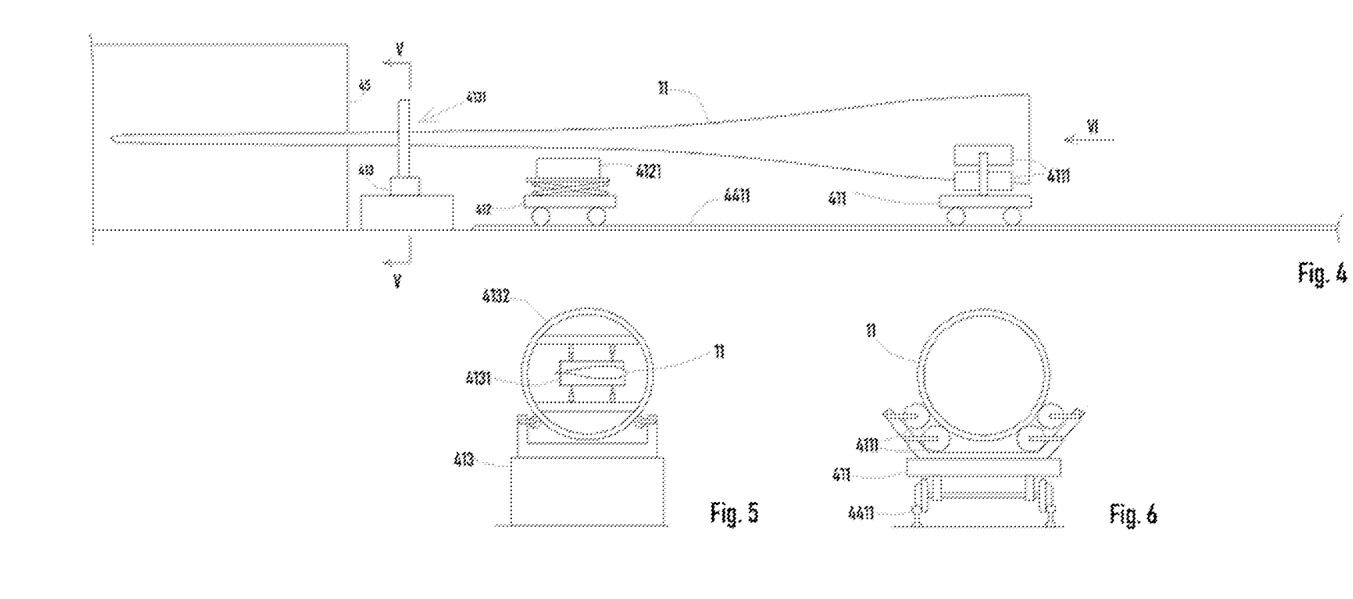
FIG. 5 shows a cross-section oriented as indicated with the arrows V-V in FIG. 4.
FIG. 6 shows a view as indicated with the arrow VI in FIG. 4.

Reference is made also to FIG. 4. The method may comprise removing, while the third support device 413 is in the support position, the support of the one or more second support elements 4121. Thereby, the blade 11 may be supported by one or more third support elements 4131 of the third support device, and by the one or more first support elements 4111. Removing the support of the one or more second support elements 4121 may comprise lowering the one or more second support elements. For this, the second support device 412 may comprise a lifting device, e.g. a scissor lift, for changing the height of the one or more second support elements 4121.

Reference is made also to FIG. 5 and FIG. 6. The one or more third support elements 4131, in this example two support elements, may be adapted to secure the blade transversely. Thereby part of the weight of the blade may be supported by one or more of the third support elements 4131. The remainder of the blade weight may be supported by the one or more first support elements 4111, in this example four support elements. The first support elements 4111 may be provided as rollers. The third support device 413 may be arranged to allow the one or more third support elements 4131 to rotate around the blade longitudinal extension. For this the third support device 413 may comprise a circular frame 4132, inside which the third support elements 4131 are located. In the preceding step of moving the blade by moving the first and second support devices 411, 412, the blade tip 112 may be moved through the frame 4132 of the third support device 413. With the blade secured by the one or more third support elements 4131, the blade may be rotated around its longitudinal extension. The rotation may be driven by one or more of the first support elements 4111. For example, one or more of the rollers 4111 may be driven, e.g. by a motor, which may be electric or hydraulic.

When supported by the first and third support devices 411, 413, a region of the blade extending from the blade tip 112 to the third support device 413 may be cantilevered from the third support device 413, as exemplified in FIG. 4. The cantilevered region of the blade is thereby free to access for maintenance or repair. The maintenance may include e.g. providing a leading edge protection on the blade. By rotating the blade around its longitudinal extension, the maintenance or repair may be facilitated. The cantilevered region may be free of objects preventing access to the surface of the cantilevered region. The cantilevered region may be of any suitable length, for example 5-40 metres, e.g. 10-20 metres. A part of the cantilevered region, or all of it, may be inside the workshop 45.

Embodiments of the invention allow for maintenance or repair work on the blade to be undertaken away from an activity region with suspended crane loads. The crane may be provided outside of the workshop. The workshop may allow staff to work on the blade, while the crane moves a further suspended blade. The further suspended blade may be moved outside of the workshop, e.g. over the workshop. Thereby, the maintenance or repair work on the blade may be undertaken while the crane moves a further suspended blade, e.g. over the workshop. Moreover, a blade may alternatively be, while suspended by the crane, subjected to a movement to or from a position outside the workshop, where it is not suspended. In said movement the crane suspended blade is moved along a path not being above the workshop.

Figure 7:
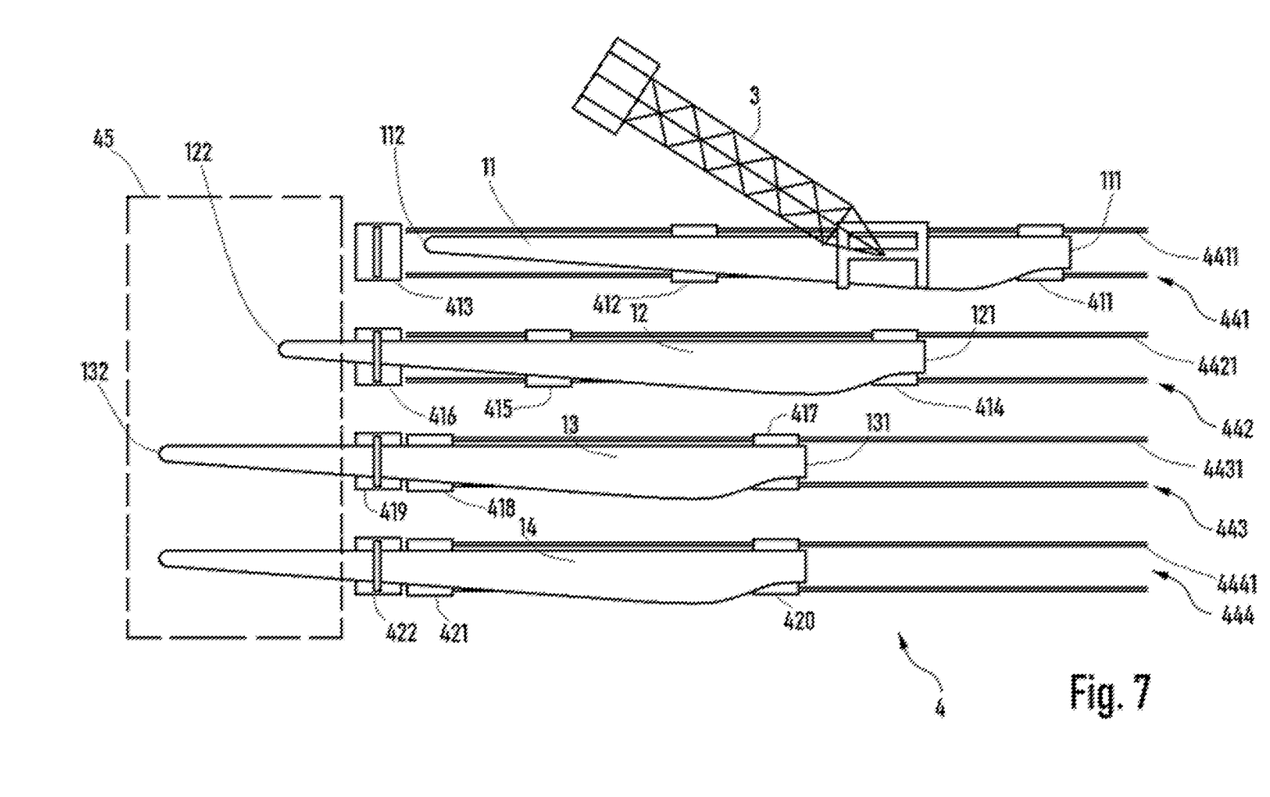
FIG. 7 shows a top view of a part of the vessel in FIG. 1.

Reference is made also to FIG. 7. In embodiments of the invention, a plurality of maintenance lines may be provided for the simultaneous maintenance or repair of a plurality of blades. An apparatus for maintaining the blades may comprise a plurality of rail sets 441, 442, 443, 444, each comprising one or more rails 4411, 4421, 4431, 4441. The rails may be arranged on a support structure 21, e.g. as exemplified in FIG. 1.

The apparatus may comprise first maintenance line. The first maintenance line may comprise a first support device 411 comprising one or more first support elements, and a second support device 412 comprising one or more second support elements. The first and second support devices 411, 412 may be arranged to be moved along the one or more rails 4411 of a first rail set 441, while a first blade 11 is supported by the first and second support elements, so that a third support device 413 assumes a support position between the second support device and the blade tip 112. The apparatus may be arranged to remove, while the third support device 413 is in the support position, the support of the second support elements so as for the blade to be supported by the one or more third support elements, and by the one or more first support elements. Thereby a region of the first blade may be cantilevered from the third support device 413. At least a part of the cantilevered region may be within a workshop 45.

The apparatus may further comprise second maintenance line. The second maintenance line may comprise a fourth support device 414 comprising one or more fourth support elements, and a fifth support device 415 comprising one or more fifth support elements. The fourth and fifth support devices 414, 415 may be arranged to be moved along the one or more rails 4421 of a second rail set 442, while a second blade 12 is supported by the fourth and fifth support elements, so that a sixth support device 416 assumes a support position between the fifth support device and the blade tip 122. The apparatus may be arranged to remove, while the sixth support device 416 is in the support position, the support of the fifth support elements so as for the blade to be supported by the one or more sixth support elements, and by the one or more fourth support elements. Thereby a region of the second blade may be cantilevered from the sixth support device 416. At least a part of the cantilevered region may be within the workshop 45.

The apparatus may further maintenance lines arranged similarly to the first and second maintenance lines. For example, a third maintenance line, for handling a third blade 13, may comprise a seventh support device 417, an eighth support device 418, one or more rails 4431 of a third rail set 443, and a ninth support device 419. A fourth maintenance line, for handling a fourth blade 14, may comprise a tenth support device 420, an eleventh support device 421, one or more rails 4441 of a fourth rail set 444, and a twelfth support device 422.

In the example in FIG. 7, a first activity region, with suspended crane loads, may be formed to the right of the workshop 45 in the figure. The workshop may form a second activity region, in which at least a part of the blades may be present for maintenance and repair. Suspended loads are kept away from the second activity region. In some embodiments, the first and second activity regions have no vertical limits. Thereby, the first and second activity regions may be completely separate horizontally. Thereby, no suspended loads may be moved over maintenance or repair activities.

Figure 8:
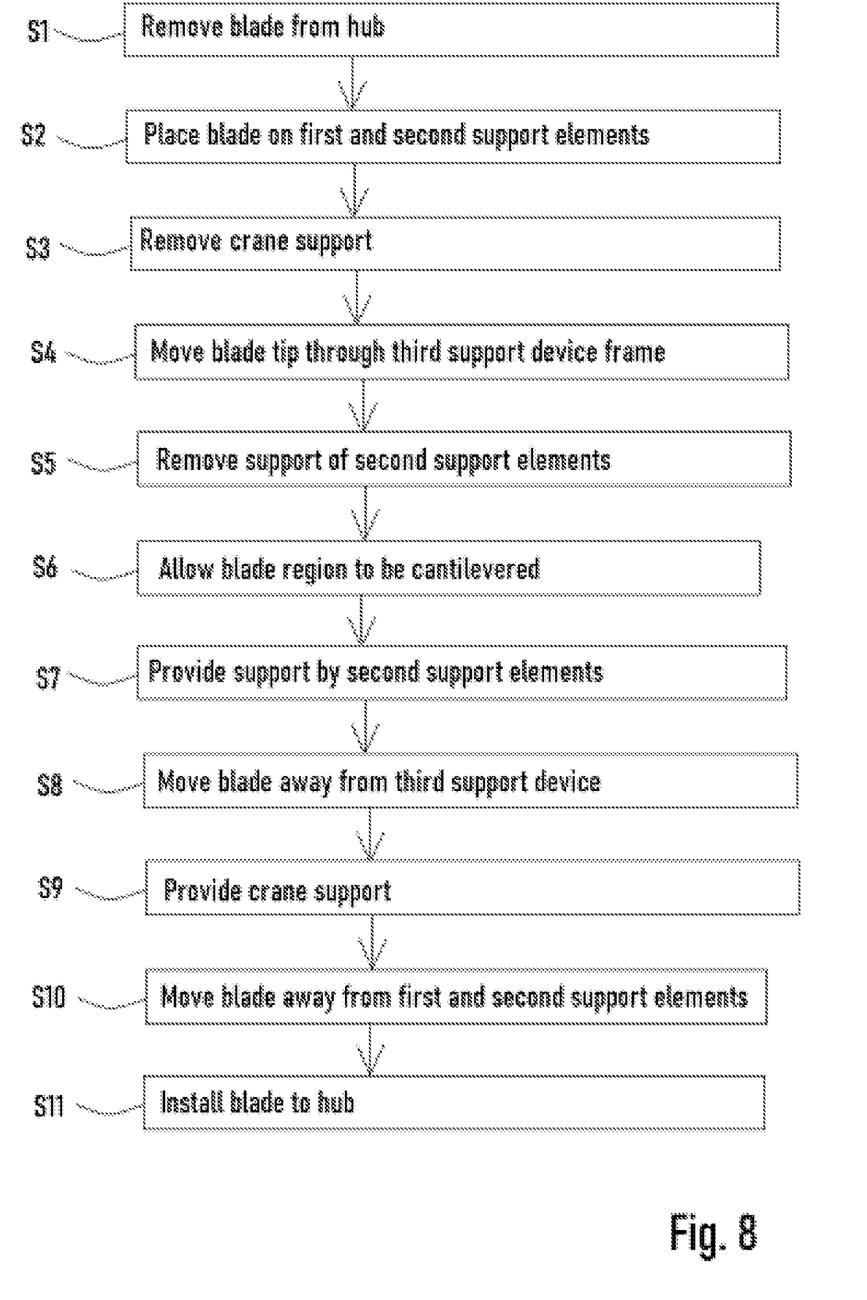
FIG. 8 is a flow diagram depicting steps in a method according to an embodiment of the invention, for maintenance or repair of a blade of the wind turbine.

FIG. 8 depicts steps in a method according to embodiments of the invention, for example some of the ones described above, for handling a blade 11 for a horizontal axis wind turbine 1. The method may comprise removing 51, by means of the one or more cranes 3, the blade 11 from a hub of the wind turbine 1, whereby the blade is supported with the one or more cranes. The method may further comprise moving, by means of the one or more cranes 3, the blade 11 so as to be placed S2 on one or more first support elements 4111 of a first support device 411 and on one or more second support elements 4121 of a second support device 412. The method may further comprise removing S3 the support of the one or more cranes 3, so as for the blade 11 to be supported by the one or more first support elements 4111 and the one or more second support elements 4121.

The method may further comprise moving the first and second support devices 411, 412 so as to move S4 a blade tip 112 of the blade through a frame 4132 of a third support device 413. Thereby, the third support device 413 may assume a support position between the second support device 412 and the blade tip 112. The method may further comprise removing S5, while the third support device 413 is in the support position, the support of the one or more second support elements 4121 so as for the blade 11 to be supported by one or more third support elements 4131 of the third support device, and by the one or more first support elements 4111. Thereby, a region of the blade extending from the blade tip 112 to the third support device 413 may be cantilevered S6 from the third support device 413. At least a part of the cantilevered region of the blade may be in a workshop 45 for maintenance or repair work on the blade.

Upon a finalised maintenance or repair procedure on the blade, the blade may be installed on the wind turbine. For this the following further steps may be undertaken.

The method may comprise providing S7, while the blade is supported by the one or more third support elements 4131, and by the one or more first support elements 4111, a support of the one or more second support elements 4121. The method may further comprise moving S8 the first and second support devices 411, 412 so as to move the blade away from the third support device 413. Thereby, the blade tip 112 may once again be moved through the third support device frame 4132. The method may further comprise providing S9 for the blade a support of the one or more cranes 3.

The method may further comprise moving S10, by means of the one or more cranes 3, the blade 11 away from the one or more first support elements 4111 and the one or more second support elements 4121. The method may further comprise installing S11, by means of the one or more cranes 3, the blade 11 to the wind turbine hub.

Many alternatives to the examples described are possible and will occur to those skilled in the art without departing from the scope of the invention which is defined by the claims.

Figure 9:
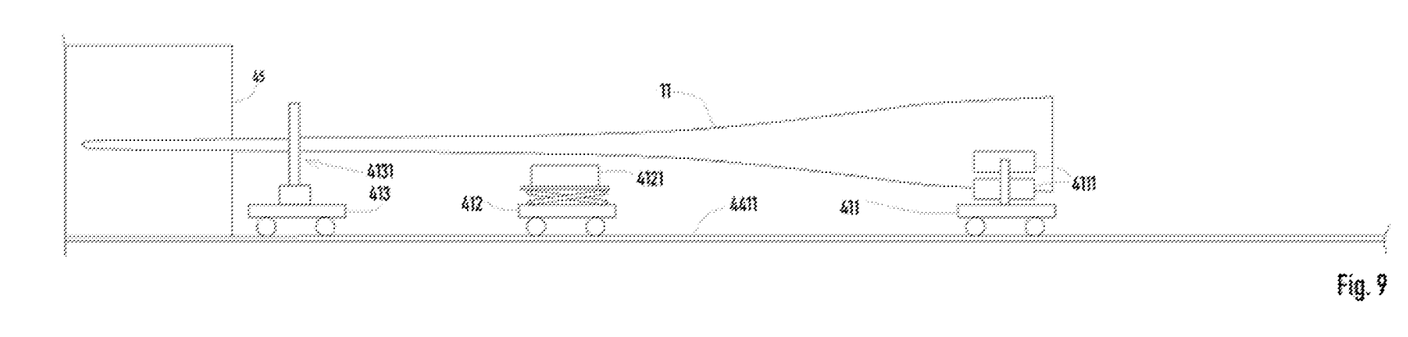
FIG. 9 shows a side view of parts of an apparatus, for maintenance or repair of wind turbine blades, according to an alternative embodiment of the invention.

For example, as exemplified in FIG. 9, the third support device 413 may be arranged to move along the one or more rails 4411. Thereby, the method may comprise moving the first and second support devices so as to move the blade so that the third support device assumes a support position between the second support device 412 and the blade tip 112.

Alternatively, or in addition, the method may comprise moving the third support device 413, so that the third support device assumes a support position between the second support device and the blade tip.

Further, the method may comprise, after the step of removing the support of the second support device 412, moving the first support device 411, and the third support device 413, while the blade 11 is supported by the one or more first support elements 4111, and the one or more third support elements 4131. Thereby, at least a portion of the blade may be moved into a workshop 45 for maintenance or repair work on the blade. In such embodiments, the one or more rails 4411 may extend into, or through, the workshop 45. Thereby, a portion of blade 11 may extend through at least a part of the workshop 45. Thereby, a region of the blade between the first and third support devices 411, 413 may be accessible for maintenance or repair. This access may be provided in the workshop.

Figure 10:
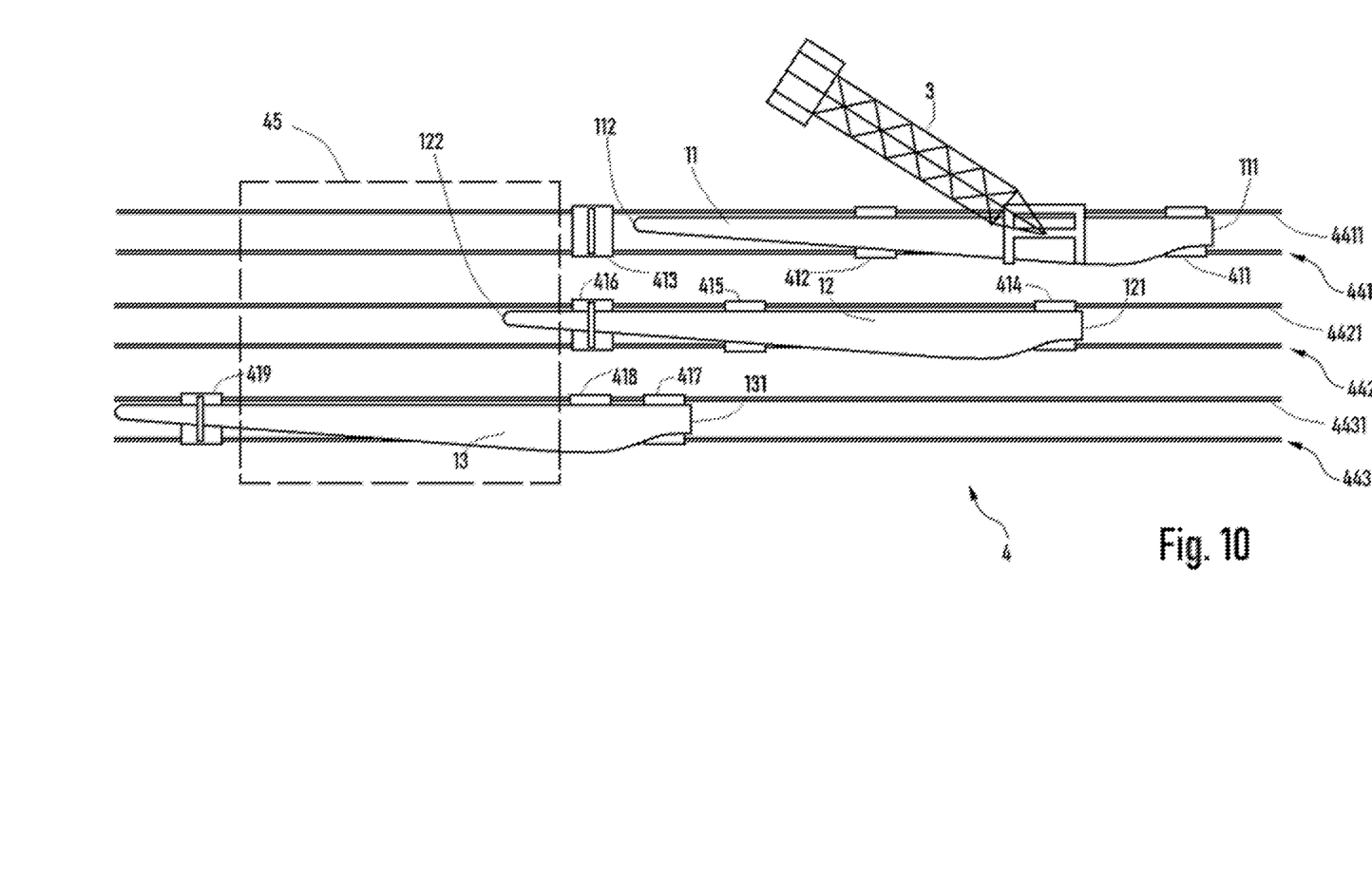
FIG. 10 shows a top view of the apparatus, parts of which is shown in FIG. 9.

As exemplified in FIG. 10, an apparatus according to an embodiment of the invention may include a plurality of blade maintenance lines. A first maintenance line, for handling a first blade 11, may comprise the first support device 411, the second support device 421, one or more rails 4411 of a first rail set 441, and the third support device 413. A second maintenance line, for handling a second blade 12, may comprise a fourth support device 414, an fifth support device 415, one or more rails 4421 of a second rail set 442, and a sixth support device 416. A third maintenance line, for handling a third blade 13, may comprise a seventh support device 417, an eighth support device 418, one or more rails 4431 of a third rail set 443, and a ninth support device 419.

In FIG. 10, in the third maintenance line, a region of the third blade 13, between the seventh and ninth support devices 417, 419 is accessible for maintenance or repair, within the workshop.

The invention claimed is:

1. A method for handling a blade for a horizontal axis wind turbine, the blade extending longitudinally between a blade root and a blade tip, the method comprising
supporting the blade with one or more cranes,
moving, by means of the one or more cranes, the supported blade so as to be placed on one or more first support elements of a first support device and on one or more second support elements of a second support device, and
removing the support of the one or more cranes, so as for the blade to be supported by the one or more first support elements and the one or more second support elements on which the blade is placed, the second support device being located between the blade root and the blade tip, and the first support device being, compared to the second support device, located closer to the blade root,
the method further comprising providing a third support device,
the method further comprising moving the first and second support devices so as to move the blade supported by the first and second support elements, and/or moving the third support device, so that the third support device assumes a support position between the second support device and the blade tip,
the method further comprising removing, while the third support device is in the support position, the support of the one or more second support elements so as for the blade to be supported by one or more third support elements of the third support device, and by the one or more first support elements.

2. The method according to claim 1, comprising removing, by means of the one or more cranes, the blade from a hub of a wind turbine, whereby the step of supporting the blade with the one or more cranes, is carried out.

3. The method according to claim 1, wherein the step of supporting the blade with the one or more cranes comprises holding the blade with a blade gripping device of a crane.

4. The method according to claim 1, wherein the third support device comprises a frame, wherein the step of moving the first and second support devices so as to move the blade comprises moving the blade tip through the frame.

5. The method according to claim 1, comprising, after the step of removing the support of the one or more cranes, moving the first support device, and at least one of the second and third support devices, while the blade is supported by the one or more first support elements, and at least one of the one or more second support elements and the one or more third support elements, so as to move at least a portion of the blade into a workshop for maintenance or repair work on the blade.

6. The method according to claim 1, wherein, when the blade is supported by the one or more third support elements, and by the one or more first support elements, a region of the blade extending from the blade tip to the third support device is cantilevered from the third support device.

7. The method according to claim 6, wherein at least a part of the cantilevered region of the blade is in a workshop for maintenance or repair work on the blade.

8. The method according to claim 1, wherein the third support device is stationary during the step of moving the first and second support devices so as to move the blade.

9. The method according to claim 1, wherein the step of removing the support of the one or more second support elements comprises lowering the one or more second support elements so as for the blade to be supported by the one or more third support elements, and by the one or more first support elements.

10. The method according to claim 1, wherein the first, second, and third support devices are located on a deck of a sea vessel during the steps of moving the blade by means of the one or more cranes, and moving the first and second support devices so as to move the blade.

11. The method according to claim 1, wherein the first and second support devices are arranged so as to be moved along one or more rails, wherein the step of moving the first and second support devices, so as to move the blade, comprises moving the first and second support devices along the one or more rails.

* * * * *